(12) United States Patent
Michels et al.

(10) Patent No.: US 10,889,196 B2
(45) Date of Patent: Jan. 12, 2021

(54) AUTONOMOUS VEHICLE SERVICING AND ENERGY MANAGEMENT

(71) Applicant: CarFlex Corporation, Los Angeles, CA (US)

(72) Inventors: Dirk Michels, Pacific Palisades, CA (US); Nathan Hightower, Jefferson, OR (US); Alexander von Welczeck, San Francisco, CA (US)

( * ) Notice: Subject to any disclaimer, the term of this patent is extended or adjusted under 35 U.S.C. 154(b) by 15 days.

(21) Appl. No.: 15/995,780

(22) Filed: Jun. 1, 2018

(65) Prior Publication Data

US 2018/0345811 A1     Dec. 6, 2018

Related U.S. Application Data

(60) Provisional application No. 62/514,593, filed on Jun. 2, 2017.

(51) Int. Cl.

| | |
|---|---|
| *B60L 53/66* | (2019.01) |
| *B60L 11/18* | (2006.01) |
| *G06Q 10/00* | (2012.01) |
| *G07C 5/08* | (2006.01) |
| *G05D 1/00* | (2006.01) |
| *G08G 1/00* | (2006.01) |
| *B60S 5/00* | (2006.01) |
| *G08G 1/017* | (2006.01) |
| *B60S 3/04* | (2006.01) |
| *G07C 5/00* | (2006.01) |

(52) U.S. Cl.
CPC ......... *B60L 53/665* (2019.02); *B60L 11/1848* (2013.01); *B60L 53/66* (2019.02); *B60S 3/04* (2013.01); *B60S 5/00* (2013.01); *G05D 1/0088* (2013.01); *G06Q 10/20* (2013.01); *G07C 5/0808* (2013.01); *G08G 1/017* (2013.01); *G08G 1/202* (2013.01); *G05D 2201/0213* (2013.01); *G07C 5/008* (2013.01); *G07C 5/0841* (2013.01); *G07C 2205/02* (2013.01)

(58) Field of Classification Search
None
See application file for complete search history.

(56) References Cited

U.S. PATENT DOCUMENTS

| | | | |
|---|---|---|---|
| 2015/0165915 A1* | 6/2015 | Cun | B60L 53/68 320/101 |
| 2017/0121019 A1* | 5/2017 | Shin | B64C 39/024 |
| 2018/0086223 A1* | 3/2018 | Lindemann | G01C 21/3469 |
| 2018/0201148 A1* | 7/2018 | Donnelly | B60L 53/38 |
| 2018/0284807 A1* | 10/2018 | Wood | G06Q 10/20 |

\* cited by examiner

*Primary Examiner* — Jonathan M Dager
*Assistant Examiner* — Garrett F Evans

(57) ABSTRACT

An architecture that can autonomously service a vehicle, such as an autonomous, battery powered electric car, in a manner that can be environmentally conscious, expeditious, efficient, and cost-effective. For example, the vehicle can be cleaned, repaired, maintained, or otherwise serviced, and charged by autonomous apparatuses of a point of distribution (POD) station. The autonomous apparatuses can be controlled by procedures developed by machine learning techniques. The charging can be accomplished by drawing power from an energy storage device that is charged in response to a determination that a demand for energy is below a defined threshold.

17 Claims, 10 Drawing Sheets

AUTONOMOUS VEHICLE SERVICING AND ENERGY MANAGEMENT

RELATED APPLICATIONS

The present application claims the benefit of, priority to, U.S. Provisional Patent Application No. 62/514,593, filed Jun. 2, 2017, and entitled "Systems and Methods for Energy Management in connection with Autonomous Vehicle Servicing," the entirety of which application is hereby incorporated by reference herein.

TECHNICAL FIELD

The subject disclosure relates to first techniques for efficient cleaning, charging, maintenance, or other servicing of autonomous vehicles as well as second techniques for efficient energy management that can be employed in connection with the first techniques.

BACKGROUND

Autonomous vehicles are vehicles that can be guided without human conduction or control. Autonomous are sometimes referred to as a driverless vehicle, a self-driving vehicle, a robot- or artificial intelligence (AI)-driven vehicle. Most autonomous vehicles are electric vehicles. Electric vehicles do not directly rely on combustion to power the vehicle, but rather rely on electric batteries that are recharged by interfacing with an energy grid and/or an energy provider.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment of the present invention, a system can comprise a memory that stores computer executable components and a processor that executes computer executable components stored in the memory. The computer executable components can comprise a cleaning component that can interface with an autonomous cleaning apparatus configured to clean an autonomous vehicle situated at a point of distribution (POD). The cleaning component can determine a cleaning procedure that is recommended to clean the autonomous vehicle. The computer executable components can comprise a service component that can interface with an autonomous service apparatus configured to service the autonomous vehicle. The service component can determine a servicing procedure that is recommended to service the autonomous vehicle. The computer executable components can comprise a charging component that can interface with an autonomous charging apparatus configured to charge the autonomous vehicle utilizing an energy storage device that is recharged in response to a determination that a demand for energy is below a defined threshold. The charging component can determine a charging procedure that is recommended to charge the autonomous vehicle.

In some embodiments, elements described in connection with the system can be embodied in different forms such as an apparatus, a computer-implemented method, a computer program product, or another form.

DETAILED DESCRIPTION

Overview

Figure 1:
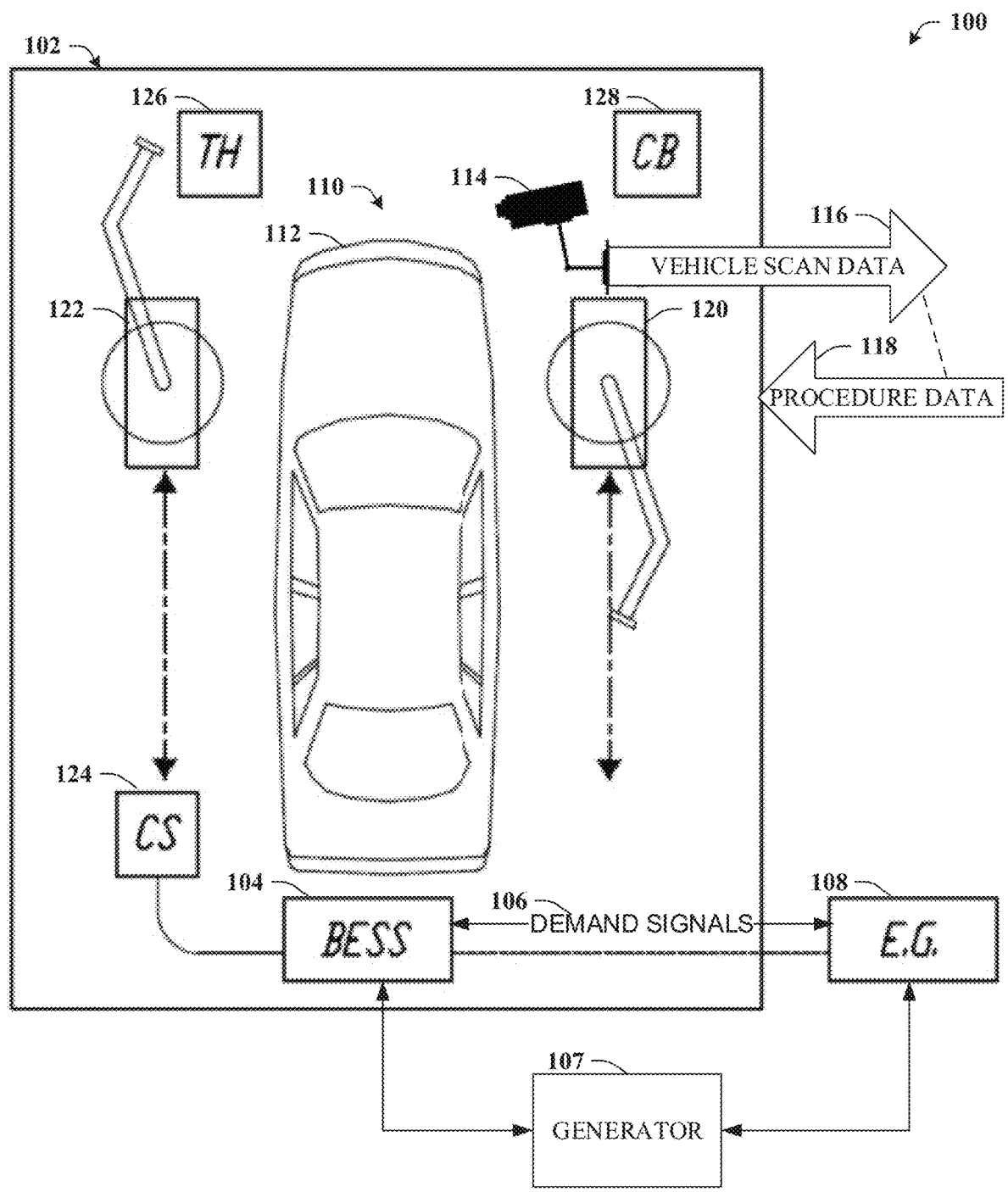
FIG. 1 illustrates a block diagram illustrating an example POD station that can be configured to autonomously service a vehicle, such as an autonomous, battery powered electric car, in a manner that can be environmentally conscious, expeditious, efficient, and cost-effective, in accordance with one or more embodiments of the disclosed subject matter.

Some embodiments of this disclosure are directed to techniques for bridging the electric vehicle industry, the autonomous vehicle industry, a societal change toward mobility-as-a-service (MaaS), and electrical distribution systems. In that regard, several observations or insights can be made. MaaS is currently a budding industry with services available to engage in ride-sharing and e-hauling for transport of people or goods. Currently, MaaS is primarily implemented with vehicles that are operated by human drivers, but in the future it is envisioned that a significant amount of MaaS applications can be implemented with autonomous vehicles. However, several challenges arise.

One challenge in connection with providing MaaS, or other similar services, is it can be advantageous if the vehicle dispatched to a client is customer-ready. For instance, an assurance that the vehicle is, e.g., clean, in good repair, and otherwise fit for operation. Such can be particularly important when the vehicle is used to service many clients in succession. Human drivers can in some instances make adequate inspections in that regard, but there is no guarantee the abilities or standards of the human driver are sufficient. On the other hand, autonomous vehicles, without a human driver to inspect them between fares, typically do not have these capabilities at all. Accordingly, satisfying the servicing demands of autonomous cars can present challenges not contemplated in connection with servicing user-operated cars.

A similar challenge arises in the context of fueling the vehicle. It can be inefficient and substantially reduce a practical service area for the vehicle to return to a central location each time the vehicle requires fuel or other servicing or maintenance. It is observed that just as conventional fueling stations improved the reach and efficiency of conventional vehicles, similar infrastructure oriented toward autonomous vehicles can provide the same for those autonomous vehicles.

As noted, most autonomous vehicles are powered by electric battery, and that trend is expected to continue. Historically, improvements to battery technology have followed a much slower rate of growth than many other technological areas. Barring an unforeseen breakthrough in battery technology, autonomous vehicles are expect to rely extensively on frequent stops to rapidly recharge batteries on a daily basis and throughout the service life of the vehicle.

For electric vehicles, the energy used to recharge local batteries is typically provided by an energy provider and generally supplied by plugging into the electric grid. Due to variances in supply and demand and other factors, prices for the energy as well as regulatory incentives and disincentives can fluctuate wildly based on the time of day, the month of the year, or external events. It is observed that it can be inefficient and costly for the energy provider and the customer to draw energy from the grid in order to charge an electric vehicle during a peak demand period. On the other hand, it is not realistic to expect a vehicle that requires recharging before servicing a waiting client to remain idle until a peak demand period passes.

Subject matter disclosed herein can, in some embodiments, provide point of distribution (POD) stations that can be configured to autonomously (e.g., to a designated policy or standard) service an autonomous vehicle in an efficient and cost-effective manner. For example, the POD station can provide cleaning services, diagnostic or maintenance services, and recharging services. The POD station can utilize a battery storage system. Recharging services can recharge vehicles from energy stored in the battery storage system, rather than directly from the grid. The battery storage system can draw energy from the grid at times of low energy demand, which can provide cost-reduction or arbitrage opportunities.

It is understood that a representative example used throughout this disclosure for the sake of brevity and clarity, relates to an autonomous car. However, it is understood that certain embodiments disclosed herein, e.g., based on implementation of the POD station, can be used in connection with human-driven cars as well, such as a human-driven electric car engaged in MaaS. It is further understood that certain embodiments disclosed herein can equally apply, e.g., based on implementation of the POD station, to substantially any type of vehicle including land-based vehicles (e.g., cars, trucks, etc.) as well as aerial vehicles such as, e.g., an unmanned aerial vehicle (UAV). Additionally or alternatively, while electric vehicles and electricity markets are a representative example, the techniques detailed herein can be applicable to other energy markets as well. For example, the battery storage system can be a resource storage system that can store any suitable resource (e.g., electricity, natural gas, propane, hydrogen for fuel cells, biofuels, etc.) that is used to power a vehicle. Opportunities detailed herein in connection with the battery storage system can also exist in connection with other resource markets and are thus considered to be within the scope of this disclosure.

Example Systems

With reference now to the drawings, referring initially to FIG. 1, illustrates a block diagram of an example point of distribution (POD) station 100. POD station 100 can be configured to autonomously service a vehicle, such as an autonomous, battery powered electric car, in a manner that can be environmentally conscious, expeditious, efficient, and cost-effective, in accordance with one or more embodiments of the disclosed subject matter.

For example, POD station 100 can comprise housing 102 representative of a housing or structure for POD station 100. Either internal or external to housing 102, POD station 100 can comprise or be operatively coupled to a resource storage device or structure. In some embodiments, the resource storage device can be a battery energy storage system (BESS) 104. Energy stored at BESS 104 can be used to charge vehicle 112, while energy used to supply BESS 104 can be received from an energy provider via electric grid 108. Advantageously, BESS 104 can be charged in response to a determination that a demand for energy is below a defined threshold, which can be determined based on demand signals 106 that can be transmitted by the energy provider. Thus, vehicle 112 requesting battery recharging services at a high demand time (e.g., peak demand) in which it is inefficient and expensive to acquire energy from electric grid 108 or at a low supply time (e.g., brownout, blackout, etc.) in which it may not be possible to acquire energy at all, can be supplied by BESS 104 utilizing energy that was acquired previously when demand was lower and/or supply more abundant. Such can be less burdensome to energy providers and can significantly reduce the cost of recharging vehicle 112. In some embodiments, energy can be supplied to vehicle 112 directly from electric grid 108, e.g., based on a comparison of a current demand for energy to the same or a different demand threshold.

In some embodiments, BESS 104 can be configured to supply up to or exceeding 30 kWh of power to vehicle 112 and to do some according to a rapid charging protocol that can complete in about 15 minutes or less. In some embodiments, BESS 104 can be configured to satisfy the demands of multiple charging procedures at POD station 100 over a period of time and be further configured to handle multiple POD stations contemporaneously. Thus, in some embodiments, BESS 104 can be configured with a capacity of up to 12,000 kWh (e.g., 12 MWh) or above. Such may represent a significant expense that would not be considered by other systems, but which can be practical in view of the observations and advantages detailed herein. Moreover, BESS 104 can, in some embodiments, be coupled to generator 107. Generator 107 can flexibly reduce reliance on electric grid 108. In some embodiments, generator 107 can be a solar (e.g., solar cells, solar shingles, etc.), wind powered, fuel cell, or other efficient generator, which can be mounted on the exterior of housing 102 or elsewhere.

POD station 100 can further comprise vehicle port 110. Vehicle port 110 can be configured to receive vehicle 112 (e.g., an autonomous car) and to interface vehicle 112 to POD station 100. In response to vehicle port 110 receiving vehicle 112, a scanner apparatus 114 can be employed to autonomously scan vehicle 112. As used herein, the term "autonomous" is intended to refer to operation without human conduction or control. Thus, scanner apparatus can be initiated and scan vehicle 112 autonomously. In some embodiments, scanner apparatus 114 can be a device that images based on optical or other electromagnetic waves. However, other types of devices are envisioned that can scan vehicle 112 according to different mechanisms or techniques and provide suitable output. Such scanning may include obtaining relevant vehicle on-board diagnostic OBD data or other data via wireless communications with the vehicle 112.

Regardless of the nature or type of scanner apparatus 114 the scan of vehicle 112 can result in vehicle state data 116. Vehicle state data 116 can be indicative of a state of vehicle 112. Such can relate to various attributes of vehicle 112 such as, e.g., cleanliness, amount and location of debris, blemishes or damage, a make, model, and/or size or dimensions of vehicle 112, a location of and/or type of charging apparatus of vehicle 112 (e.g., plug-in, induction, etc.), and so on. In some embodiments, the scanning procedure can be a two-stage procedure, in which the exterior of vehicle 112 can be scanned during a first stage and the interior of vehicle 112 is scanned during the second stage. In embodiments with user-operated vehicles, human occupants of vehicle 112 can exit prior to the scanning procedure or between stage one and stage two of the scanning procedure. Alternatively, an interior scan may be skipped if a human occupant is within the vehicle 112.

Vehicle scan data 116 can be provided to a computing system, which can be local (e.g., integrated with POD station 100) or remote (e.g., an off-site or cloud-based computing architecture). In response to the vehicle scan data 116, and other suitable data, the computing system can generate procedure data 118, which can be received by POD station 100. For example, procedure data 118 can comprise a cleaning procedure, a repair or service procedure, a charging procedure, and so forth.

POD station 100 can further comprise cleaning apparatus 120. Cleaning apparatus 120 can be configured to autonomously clean vehicle 112 according to vehicle scan data 116 and/or the cleaning procedure (e.g., received as part of procedure data 118). In some embodiments, a waterless car wash can be employed as part of the cleaning procedure of procedure data 118. Apparatus or tools for various portions or functions of the cleaning procedure can be selected from a tool holder (TH) 126. Waste can be removed and placed in a collection bin (CB) 128 that can optionally be autonomously sorted for recycling or other disposal. In some embodiments, apparatuses detailed herein, such as cleaning apparatus 120, can be a robotic apparatus that is controlled according to software routines or algorithms, all or a portion of which can be specified by procedure data 118.

POD station 100 can also include a service apparatus 122. Service apparatus can be configured to autonomously repair or service (e.g., provide defined maintenance) vehicle 112 based on vehicle scan data 116 and/or the servicing procedure. For example, detailing procedures can be employed to repair dents or scratches. Repair procedures can be implemented to repair, replace, or maintain mechanical, electrical, or computer systems (e.g., firmware states), which can be determined from vehicle scan data 116 and/or based on an interface with an on-board diagnostic (OBD) system of vehicle 112.

POD station 100 can further include a charging apparatus (e.g., charging station (CS)) 124. Charging apparatus 124 can be configured to autonomously charge vehicle 112 according to vehicle scan data 116 and/or the charging procedure of procedure data 118. It should be understood that in the discussion of the present embodiment and of embodiments to follow, repetitive description of like elements employed in the various embodiments described herein is omitted for sake of brevity.

Figure 2:
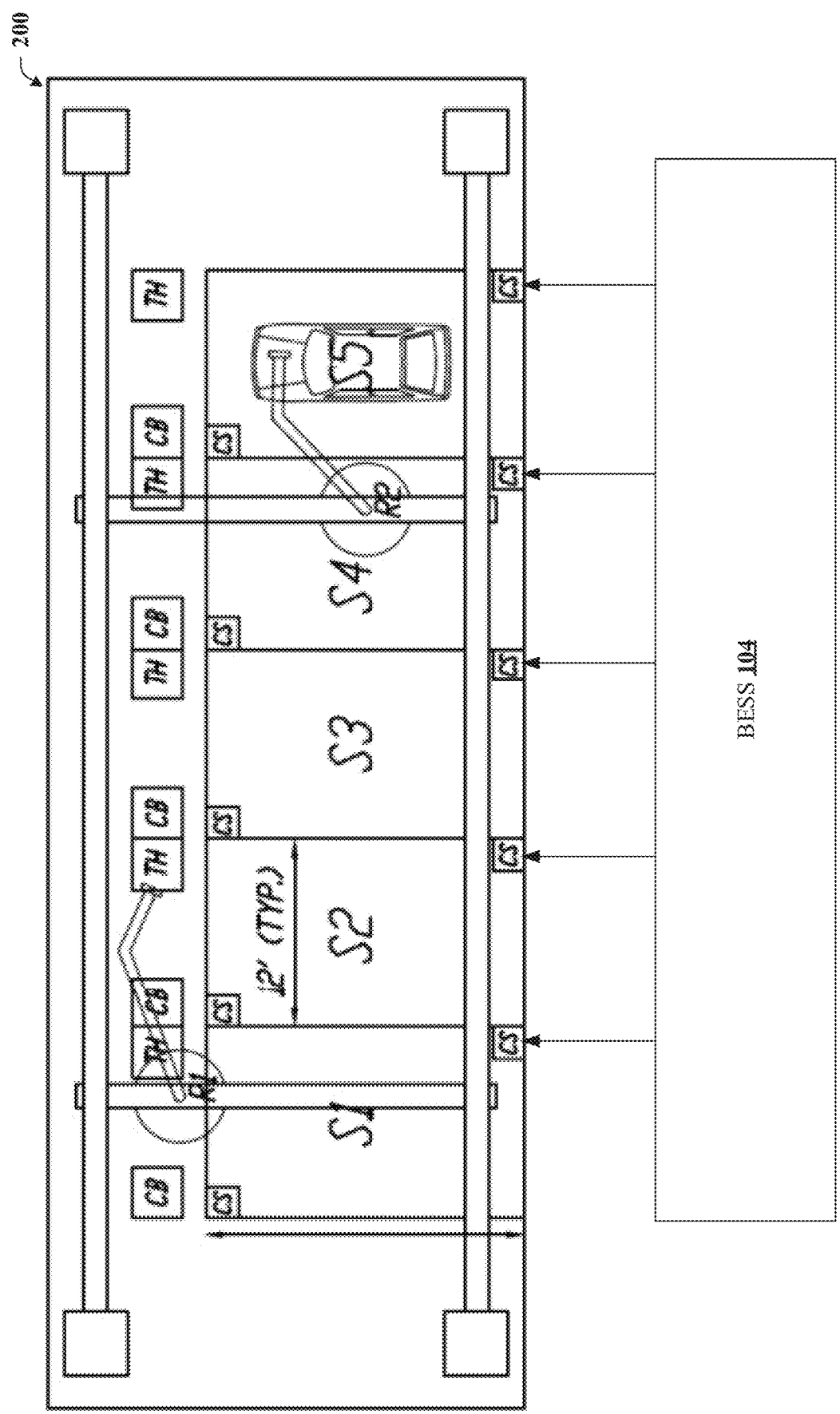
FIG. 2 illustrates a block diagram illustrating an example embodiment of a POD facility having multiple adjoining POD stations, in accordance with one or more embodiments of the disclosed subject matter.

Turning now to FIG. 2, a block diagram of system 200 is illustrated. System 200 illustrates an example embodiment of a POD facility having multiple adjoining POD stations, in accordance with one or more embodiments of the disclosed subject matter. In some embodiments, system 200 can provide all or a portion of the services provided in connection with vehicle 112 (e.g., detailed in connection with POD station 100), which can be contemporaneously provided to multiple vehicles situated in multiple POD stations. In some embodiments, BESS 104 can supply vehicles in any or all of the POD stations of the POD facility. In some embodiments, a single POD apparatus (e.g., scanner apparatus 114, cleaning apparatus 120, service apparatus 122, charging apparatus 124, etc.) can service multiple vehicles contemporaneously, e.g., service two vehicles respectively situated at adjacent POD stations. As indicated in station S2, it may be desirable to configure stations with a typical width of 12 feet. It is appreciated that, while a single row of POD stations 51, S2, S3, S4, S5 is depicted; individual POD stations of the POD facility can be in other suitable configurations.

Figure 3:
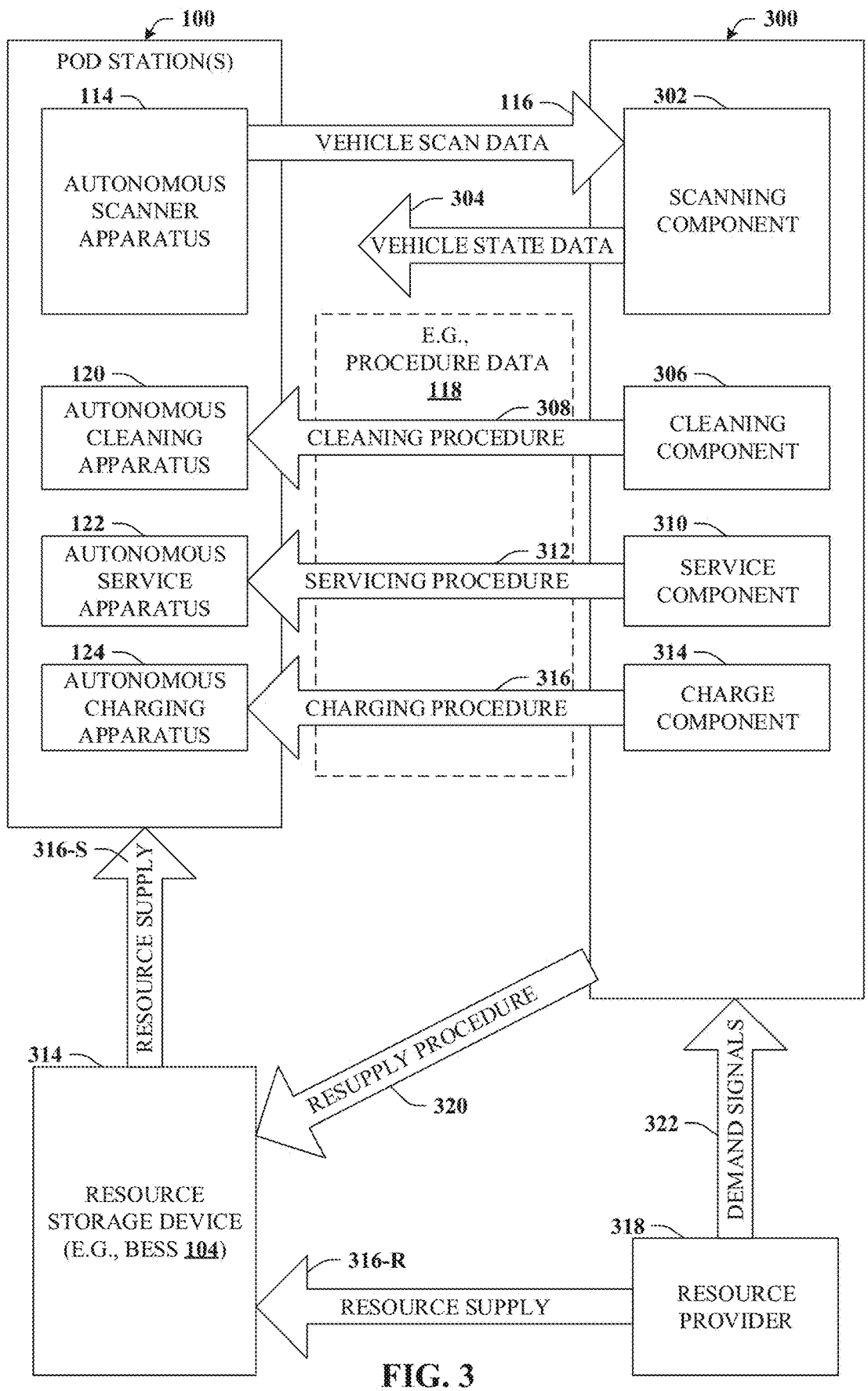
FIG. 3 illustrates a block diagram of an example system that can facilitate autonomously servicing a vehicle in a manner that can be environmentally conscious, expeditious, efficient, and cost-effective, in accordance with one or more embodiments of the disclosed subject matter.

With reference now to FIG. 3, system 300 is illustrated. System 300 can facilitate autonomously servicing a vehicle in a manner that can be environmentally conscious, expeditious, efficient, and cost-effective, in accordance with one or more embodiments of the disclosed subject matter. System 300 can comprise a processor and a memory that stores executable instructions that, when executed by the processor, facilitate performance of operations. Examples of said processor and memory, as well as other suitable computer or computing-based elements, can be found with reference to FIG. 10, and can be used in connection with implementing one or more of the systems or components shown and described in connection with FIG. 3 or other figures disclosed herein.

System 300 can comprise scanning component 302 in some embodiments. Scanning component 302 can be configured to receive vehicle scan data 116 from autonomous scanner apparatus 114. Based on vehicle scan data, scanning component 302 can generate vehicle state data 304. Vehicle state data 304 can be indicative of a state of a vehicle (e.g., vehicle 112) such as a cleanliness condition, a maintenance or service condition, vehicle type, a location and/or type of charging or other devices, etc.). In some embodiments, vehicle state data 304 can be provided to POD station 100. Additionally or alternatively, vehicle state data 304 can be utilized by other components of system 300, e.g., to generate procedure data 118. In some embodiments, all or portions of scanning component 302 can be remote from system 300 and/or integrated with a cloud architecture or a machine learning architecture.

System 100 can comprise cleaning component 306. Cleaning component 306 can interface with autonomous cleaning apparatus 120, which can be configured to clean vehicle 112. Cleaning component 306 can be configured to determine cleaning procedure 308. In some embodiments, cleaning component 306 can determine cleaning procedure 308 based on vehicle state data 304.

System 100 can comprise service component 310. Service component 310 can interface with autonomous service apparatus 122, which can be configured to service vehicle 112. Service component 306 can be configured to determine servicing procedure 312. In some embodiments, service component 310 can determine servicing procedure 312 based on vehicle state data 304.

System 100 can further comprise charge component 314. Charge component 314 can interface with autonomous charging apparatus 124, which can be configured to charge (or otherwise refuel) vehicle 112. Charging component 314 can be configured to determine charging procedure 316. In some embodiments, charge component 314 can determine charging procedure 316 based on vehicle state data 304. In order to effectuate charging procedure 316, energy or another resource can be drawn from resource storage device 314, as illustrated by resource supply 316-S that supplies vehicle 112. Resource storage device 314 can be resupplied (illustrated as resource supply 316-R) via resource provider 318.

Beneficially, storage device 314 can be resupplied (e.g., recharged) in response to resupply procedure 320 that can be determined by charge component 314, system 300, or another element or component described herein. Resupply procedure 320 can resupply resource storage device 314 in response to a determination that a demand for the resource is below a defined threshold. An indication of a demand for the resource can be provided by demand signals 322 from resource provider 318. Thus, resource storage device 314 can be charged when renewable energy sources are operational and/or before or after peak demand times, but can supply the resource at other times.

In some embodiments, cleaning component 306 can be configured to contemporaneously interface with a second autonomous cleaning apparatus configured to clean a second vehicle, situated at a second POD station, contemporaneously with cleaning of vehicle 112 by autonomous cleaning apparatus 120. In some embodiments, charging component 314 can be configured to contemporaneously interface with a second autonomous charging apparatus configured to charge the second vehicle contemporaneously with charging of vehicle 112 by the autonomous charging apparatus 124. In some embodiments, service component 310 can be configured to contemporaneously interface with a second autonomous service apparatus configured to service the second vehicle contemporaneously with servicing of vehicle 112 by the autonomous service apparatus 122

Figure 4:
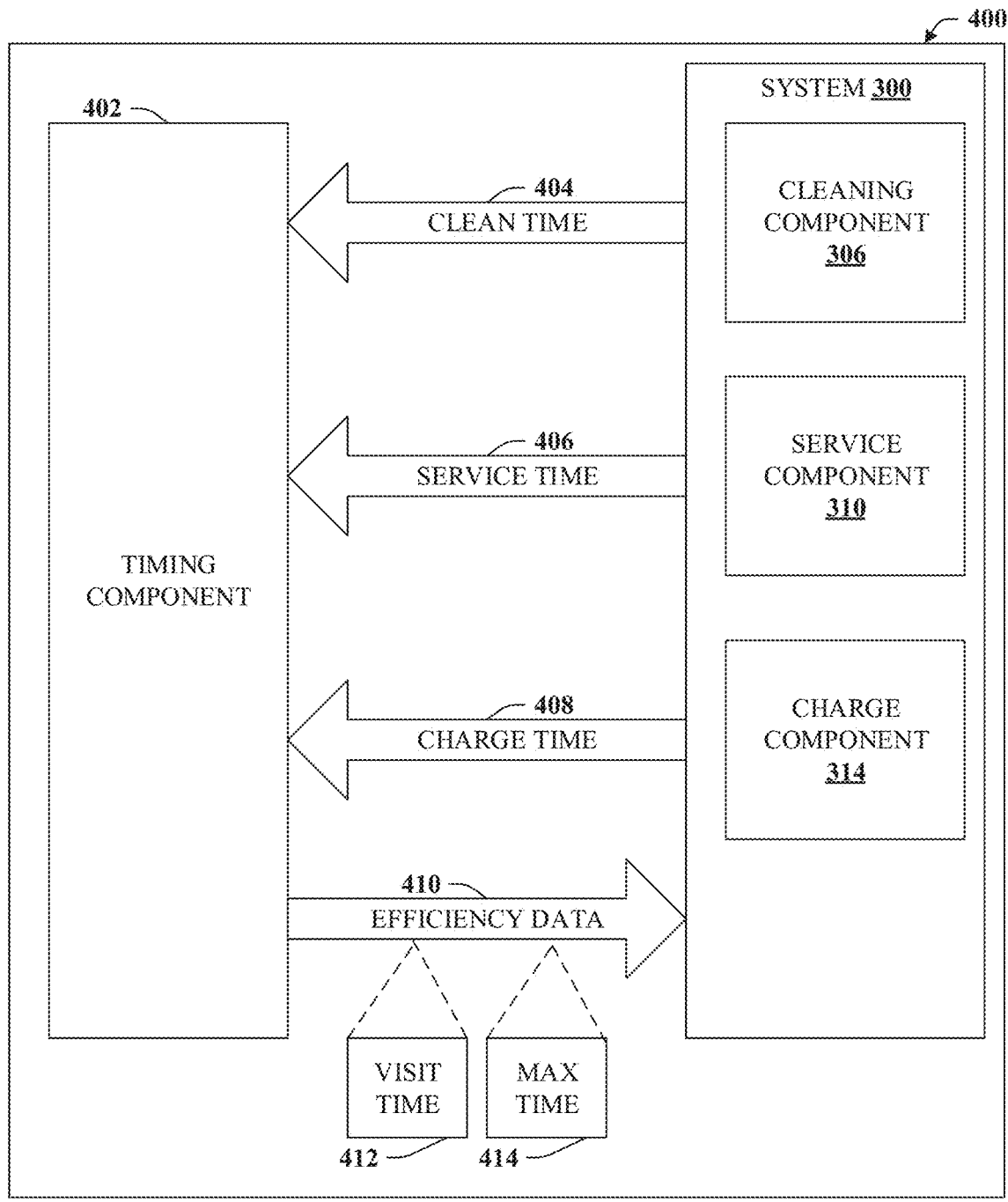
FIG. 4 illustrates a block diagram of an example system that can utilize a timing component to efficiently manage visits to the POD station in accordance with one or more embodiments of the disclosed subject matter.

Referring now to FIG. 4, system 400 is illustrated. System 400 illustrates an example utilizing a timing component to efficiently manage visits to the POD station 100 in accordance with one or more embodiments of the disclosed subject matter. For example, cleaning component 306 can determine clean time 404, which can be indicative of an estimated time to clean vehicle 112. In some embodiments, clean time 404 can be determined based on vehicle state data 304 and/or vehicle scan data 116. Similarly, service component 310 can determine service time 406, which can be indicative of an estimated time to service vehicle 112. In some embodiments, service time 406 can be determined based on vehicle state data 304 and/or vehicle scan data 116. Likewise, charge component 314 can determine charge time 408, which can be indicative of an estimated time to charge vehicle 112. In some embodiments, charge time 408 can be determined based on vehicle state data 304 and/or vehicle scan data 116.

System 400 can further comprise timing component 402. Timing component 402 can be configured to compare clean time 404, service time 406, and charge time 408. Based on that comparison, timing component 402 can generate efficiency data 410. Efficiency data 410 can comprise visit time 412, a maximum time 414, as well as other suitable data or instructions. Visit time 412 can be indicative of a recommended POD visit time. Maximum time 414 can be representative of a maximum visit time, which can be set to about 15 minutes or another value based on implementation or policy.

To give a concrete example, consider a case in which clean time 404 is estimated to be 8 minutes, service time 406 is estimated to be about 4 minutes, and charge time 408 is estimated to be 12 minutes. In that case, timing component 402 can select the highest of the time values (i.e., 12 minutes) as the recommended POD visit time 412, provided such is less than max time 414 (e.g., 15 minutes). However, in some embodiments, efficiency data 410 can comprise an instruction to change a given procedure and/or a recommendation for a given procedure. For example, noting that visit time 412 is 12 minutes, one or both of the cleaning procedure 308 or the servicing procedure 312 can be changed to a more thorough or complex procedure, even if such takes more time. As another example, servicing procedure 312 can be selected as a more thorough or complex procedure that takes 8 minutes instead of the estimated 4 minutes, and charging procedure 316 can be selected as a less thorough procedure that takes 8 minutes instead of 12 minutes. In this latter case, vehicle 112 can be on its way after an estimated 8 minute visit time 412. Additional details regarding procedure data 118 selection and/or modification is described in connection with FIG. 5.

Figure 5:
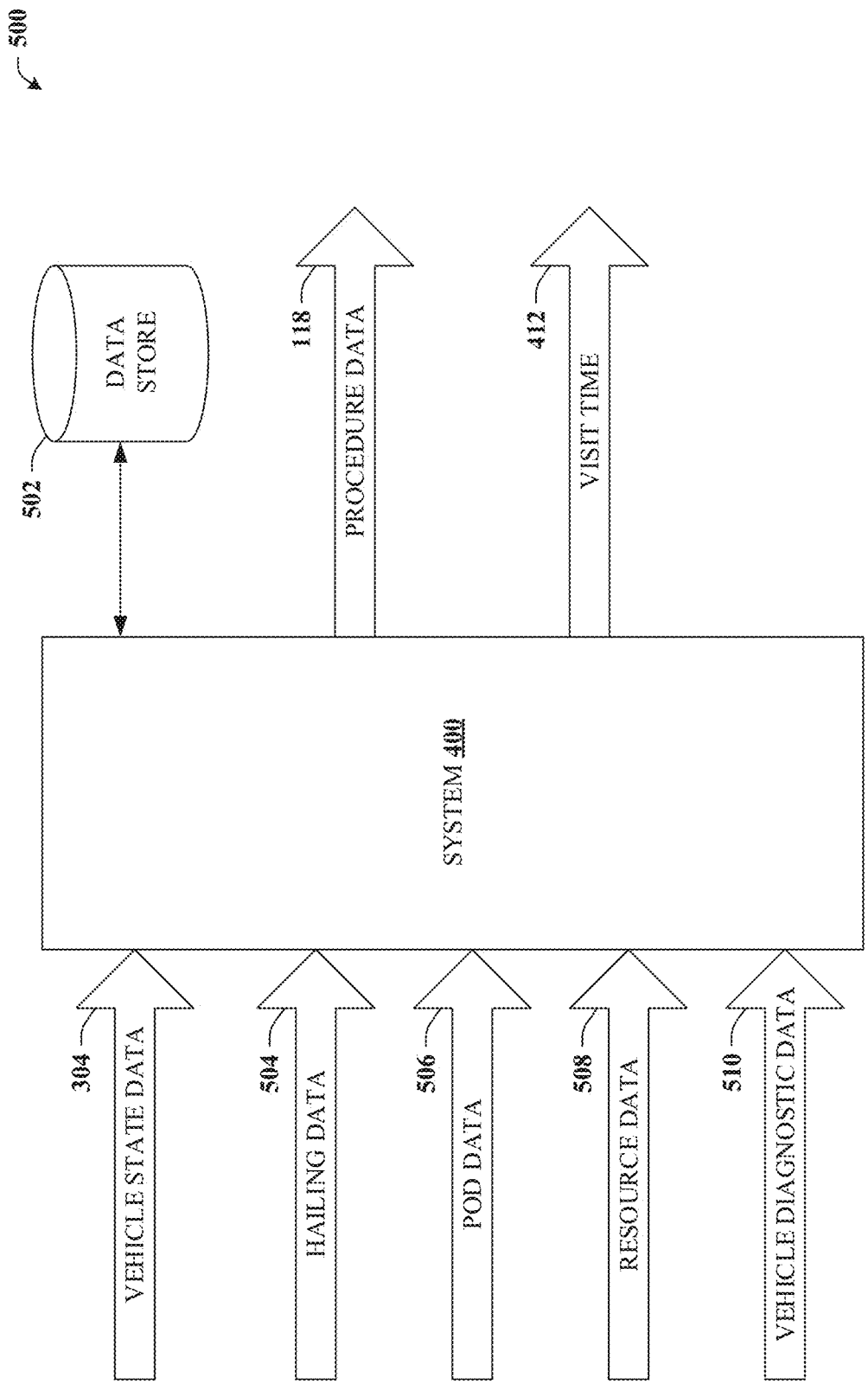
FIG. 5 depicts a block diagram of an example system illustrating an additional example of determining procedure data and the visit time in accordance with one or more embodiments.

Turning now to FIG. 5, system 500 is illustrated. System 500 illustrates an additional example of determining procedure data 118 and the visit time 412 in accordance with one or more embodiments. As detailed above, procedure data 118 can include various procedures (e.g., cleaning procedure 308, a servicing procedure 312, a charging procedure 316, etc.) that were determined or selected to be implemented on vehicle 112. For instance, based on vehicle state data 304, system 400 or other systems or components detailed herein, can select an appropriate procedure (e.g., 308, 312, 316) from a group of procedures. This group of procedures can be stored to data store 502, which can represent any suitable type of non-volatile storage device or devices. Upon selection of procedure data 118, visit time 412 can be determined.

In some embodiments, procedure data 118 and/or visit time 412 can be further determined based on hailing data 504. Hailing data 504 can be indicative of a number of requests for transport by a group of vehicles having access to POD station 100. All or portions of hailing data 504 can be received, e.g., from a MaaS system using a fleet of vehicles to provide the mobility service. Hailing data 504 can include the number of requests for transport, pick-up locations, destination locations, and so forth. From this information, system 400 can determine or infer that demand for the services provided by one or more POD station 100 or one or more groups of POD stations 200 will increase or decrease within a defined time window (e.g., the next few hours). Based on that information, system 400 can decide to update maximum time 414 or instruct other changes. For example, in the case where high demand is forecast, steps can be taken to increase the throughput of a POD station 100. In that regard, maximum time 414 can be reduced (e.g., from 15 minutes down to 10 minutes), which can affect both the procedures selected (e.g., procedure data 118) and visit time 412. In the alternative, it may be desirable to raise the maximum time 414 for a vehicle 112 if less than all of the POD stations in a system 200 are in demand or if forecast data indicates low demand for either or both of (a) POD stations and (b) vehicles. In this manner, it may be possible to obtain deeper charging, more thorough cleaning, and/or more thorough servicing at times when the relevant demand permits.

In some embodiments, procedure data 118 and/or visit time 412 can be further determined based POD data 506. POD data 506 can represent a current or forecasted state of one or more POD stations 100 that are available to service the demand Such might include an indication of a count of POD stations within a service area, whether a given POD station 100 is currently or forecasted to be online or offline, whether currently or forecasted to be in use or have a queue, a state or capacity of an associated resource storage device 314, and so on.

In some embodiments, procedure data 118 and/or visit time 412 can be further determined based resource data 508. Resource data 508 can be representative of a current or forecasted demand for electricity or another resource within a defined time window. In some embodiments, procedure data 118 and/or visit time 412 can be further determined based vehicle diagnostic data 510. Vehicle diagnostic data 510 can be received from vehicle 112 and can be representative of one or more states of vehicle 112 determined by local sensor devices.

Figure 6:
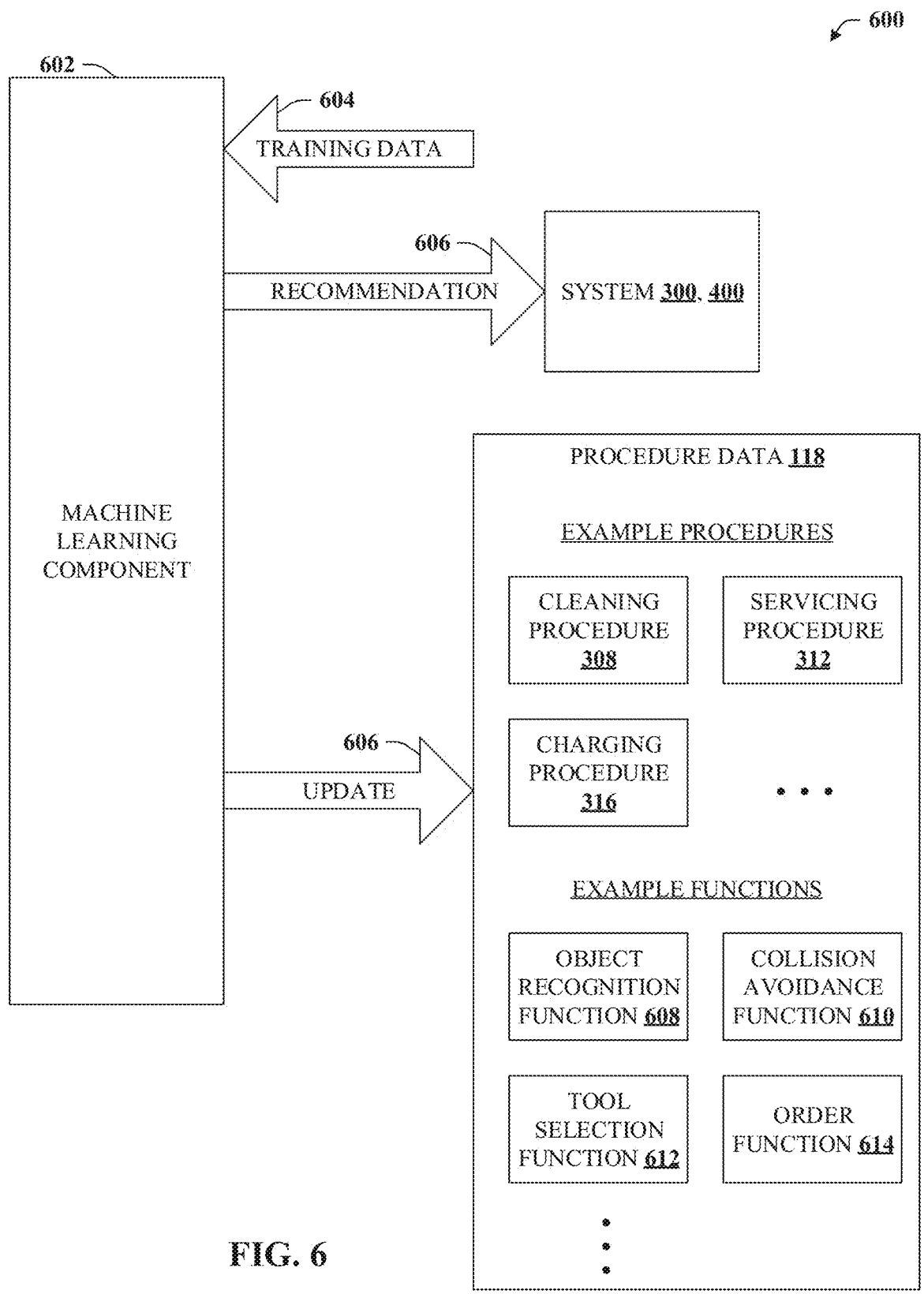
FIG. 6 depicts a block diagram of an example system illustrating an example machine learning component that can be employed in accordance with one or more embodiments of the disclosed subject matter.

Referring now to FIG. 6, system 600 is depicted. System 600 illustrates an example machine learning component that can be employed in accordance with one or more embodiments of the disclosed subject matter. In some embodiments, machine learning component 602 can be included in one or more systems or components detailed herein (e.g., timing component 402), while in other embodiments machine learning component 602 can be remote and communicatively coupled to one or more systems or components detailed herein, such as residing in a cloud architecture.

Machine learning component 602 can be configured to receive training data 604. Training data 604 can include at least vehicle state data 304, but can include substantially any other data detailed herein or otherwise suitable. As used herein, training data 604 is intended to include information by which algorithms of machine learning component 602 "learns" or is trained as well as the information input to those algorithms resulting in a decision. Thus, training data 604 can be employed to train machine learning component 602 and other training data 604 can be input to solicit recommendation 606. Recommendation 606 can be a recommendation that systems 300, 400 or other systems or components detailed herein select a particular procedure (e.g., procedure data 118) for a particular vehicle 112 based on car state data 304 and/or other factors for that vehicle 112.

As noted, data store 502 can store substantially any number of cleaning procedures 308 (or servicing procedures 312, and charging procedures 316), any one of which can be selected for use on a particular vehicle 112. Furthermore, a given procedure can include various functions or routines that are used in connection with implementing the particular procedure. For example, cleaning procedure 308 can include object recognition function 608 that can be used to, e.g., differentiate types of debris (e.g., paper versus plastic) as well as differentiating debris from non-debris or articles of value. Cleaning procedure 308 can include collision avoidance function 610 that can be used to, e.g., prevent or mitigate collisions with surfaces or structures of vehicle 112 as well as other apparatuses of POD station 100 concurrently operating on vehicle 112.

As another example, cleaning procedure 308 can include tool selection function 612 that can be used to, e.g., to identify a type of tool to use for a given sub-procedure. Additionally or alternatively, cleaning procedure 308 can include order function 614 that can be used to, e.g., to identify an order for the sub-procedure of cleaning procedure 308 as well as an order for other procedures (e.g., servicing or charging) or associated sub-procedures. In some embodiments, machine learning component 602 can determine update 606. Update 606 can represent an update to one or more of cleaning procedure 308, servicing procedure 312, or charging procedure 316 or an update to one or more functions of the procedure.

Figure 7A:
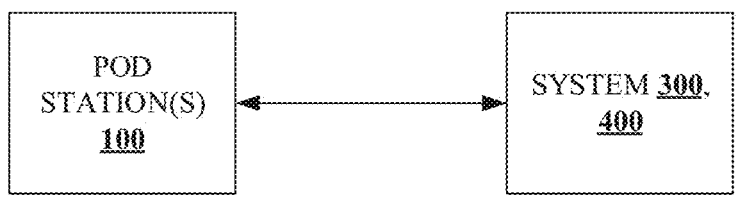
FIGS. 7A-B illustrate block diagrams of example architectural implementations that can be employed in accordance with one or more embodiments of the disclosed subject matter.
Figure 7B:
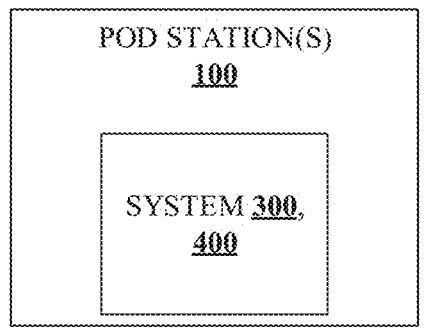

Turning now to FIGS. 7A-B, various block diagrams 700A-B of example architectural implementations are illustrated in accordance with one or more embodiments of the disclosed subject matter.

For example, block diagram 700A depicts an example architectural design in which all or portions of systems 300 or 400 (or other components detailed herein) are remote from POD station 100. For example, all or portions of systems 300 or 400 etc., can be implemented on a computing device (e.g., general purpose or special purpose interface equipment, a PC, laptop, tablet, phone, etc.). As one example, all or portions of system 300 or 400 can be implemented in virtual machines in a cloud architecture. Additionally or alternatively, block diagram 700B depicts an example architectural design in which all or portions of systems 300 or 400 (or other components detailed herein) are include in or operatively coupled to POD station 100.

Figure 8:
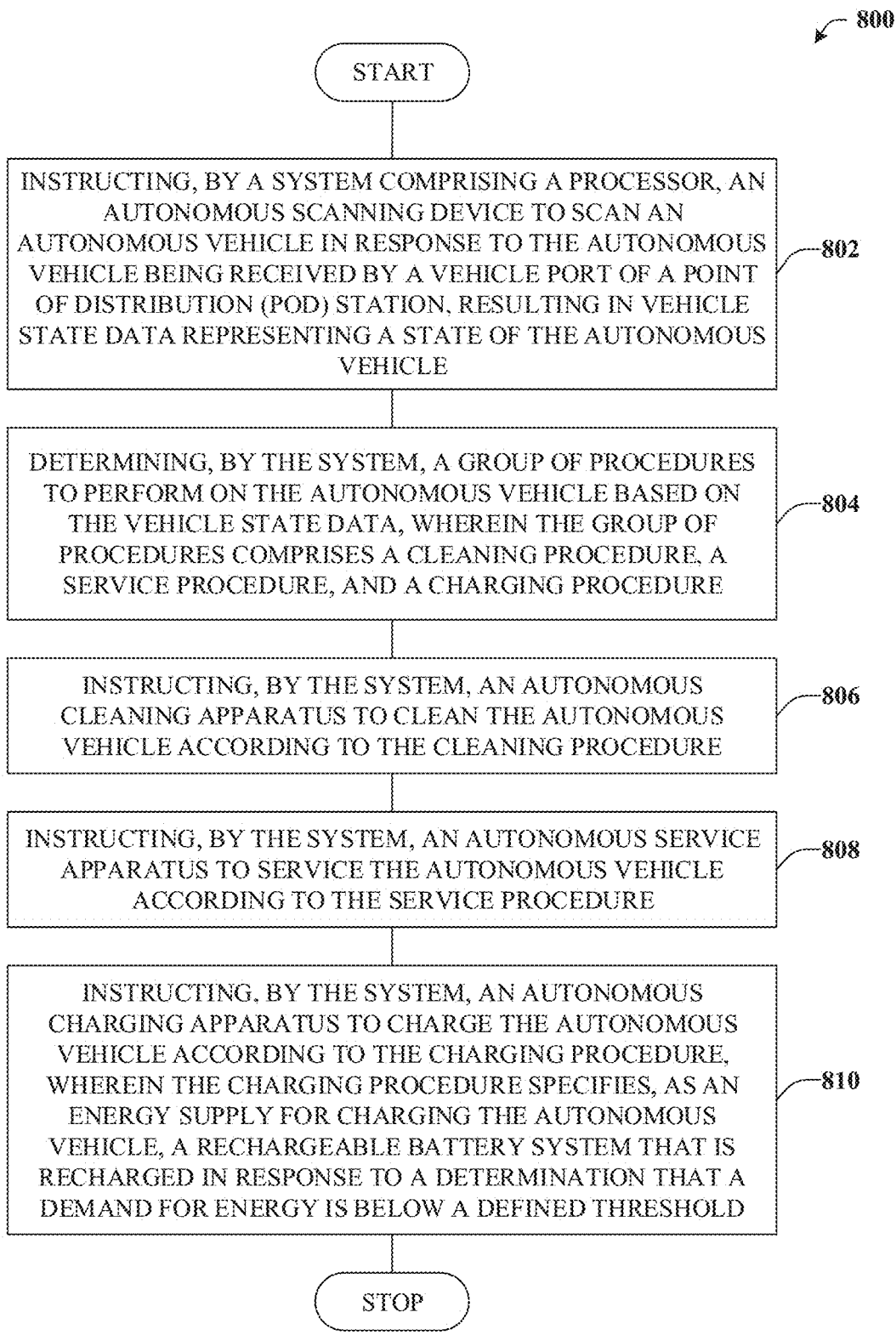
FIG. 8 illustrates a flow diagram of an example, non-limiting computer-implemented method that can autonomously service a vehicle in a manner that can be environmentally conscious, expeditious, efficient, and cost-effective in accordance with one or more embodiments.
Figure 9:
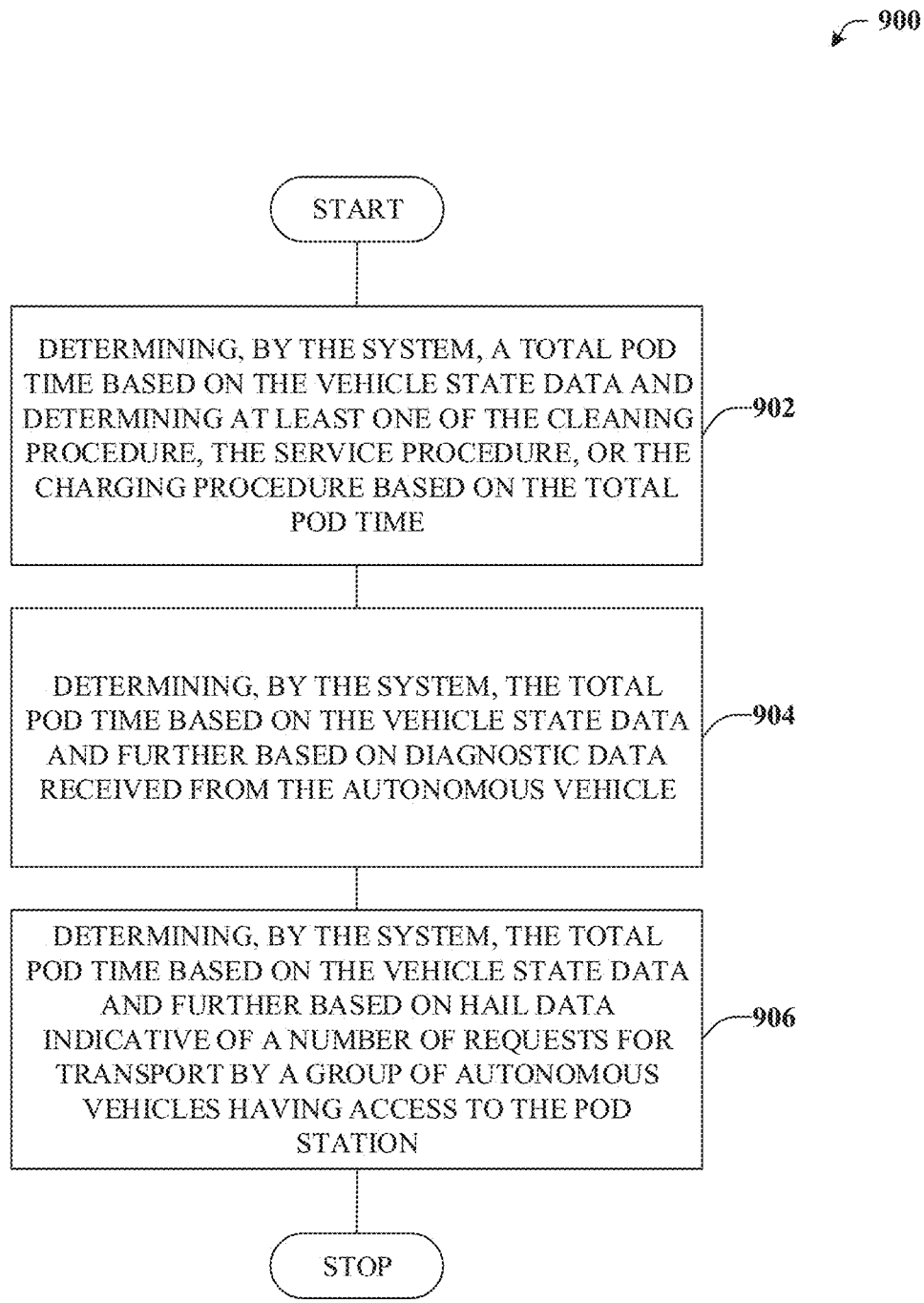
FIG. 9 illustrates a flow diagram of an example, non-limiting computer-implemented method for determining a total POD visit time in accordance with one or more embodiments.

FIGS. 8 and 9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 8 illustrates a flow diagram 800 of an example, non-limiting computer-implemented method that can autonomously service a vehicle in a manner that can be environmentally conscious, expeditious, efficient, and cost-effective in accordance with one or more embodiments. For example, at reference numeral 802, a device (e.g., system 300 or 400) operatively coupled to a processor can instruct an autonomous scanning device to scan an autonomous vehicle, which can result in vehicle state data representative of a state of the autonomous vehicle. In some embodiments, the instruction to scan the autonomous vehicle can be in response to the autonomous vehicle being received by a vehicle port of a POD station.

At reference numeral 804, the device can determine a group of procedures to perform on the autonomous vehicle based on the vehicle state data. This group of procedures can comprise, e.g., a cleaning procedure, a service procedure, and a charging procedure. The cleaning procedure can be configured to, e.g., clean the autonomous vehicle. The service procedure can be configured to, e.g., repair, maintain, or otherwise service the autonomous vehicle. The charging procedure can be configured to, e.g., charge or otherwise refuel the autonomous vehicle. In order to accomplish the group of procedures, the device can instruct various apparatuses of the POD station.

For example, at reference numeral 806, the device can instruct an autonomous cleaning apparatus to clean the autonomous vehicle according to the cleaning procedure. At reference numeral 808, the device can instruct an autonomous service apparatus to service the autonomous vehicle according to the service procedure.

At reference numeral 810, the device can instruct an autonomous charging apparatus to charge the autonomous vehicle according to the charging procedure. In some embodiments, the charging procedure can specify an energy supply for charging the autonomous vehicle. For example, a rechargeable battery system that is recharged in response to a determination that a demand for energy is below a defined threshold can be specified for charging the autonomous vehicle.

Turning now to FIG. 9, illustrated is a flow diagram 900 of an example, non-limiting computer-implemented method for determining a total POD visit time in accordance with one or more embodiments. At reference numeral 902, the device (e.g., system 400) can determine a total POD time based on the vehicle state data. In some embodiments, the device can determine, recommend, or update at least one of the cleaning procedure, the service procedure, or the charging procedure based on the total POD time.

At reference numeral 904, the device can determine the total POD time based on the vehicle state data and further based on diagnostic data received from the autonomous vehicle.

At reference numeral 906, the device can determine the total POD time based on the vehicle state data and further based on hail data indicative of a number of requests for transport by a group of autonomous vehicles having access to the POD station.

It is understood that the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create ways for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
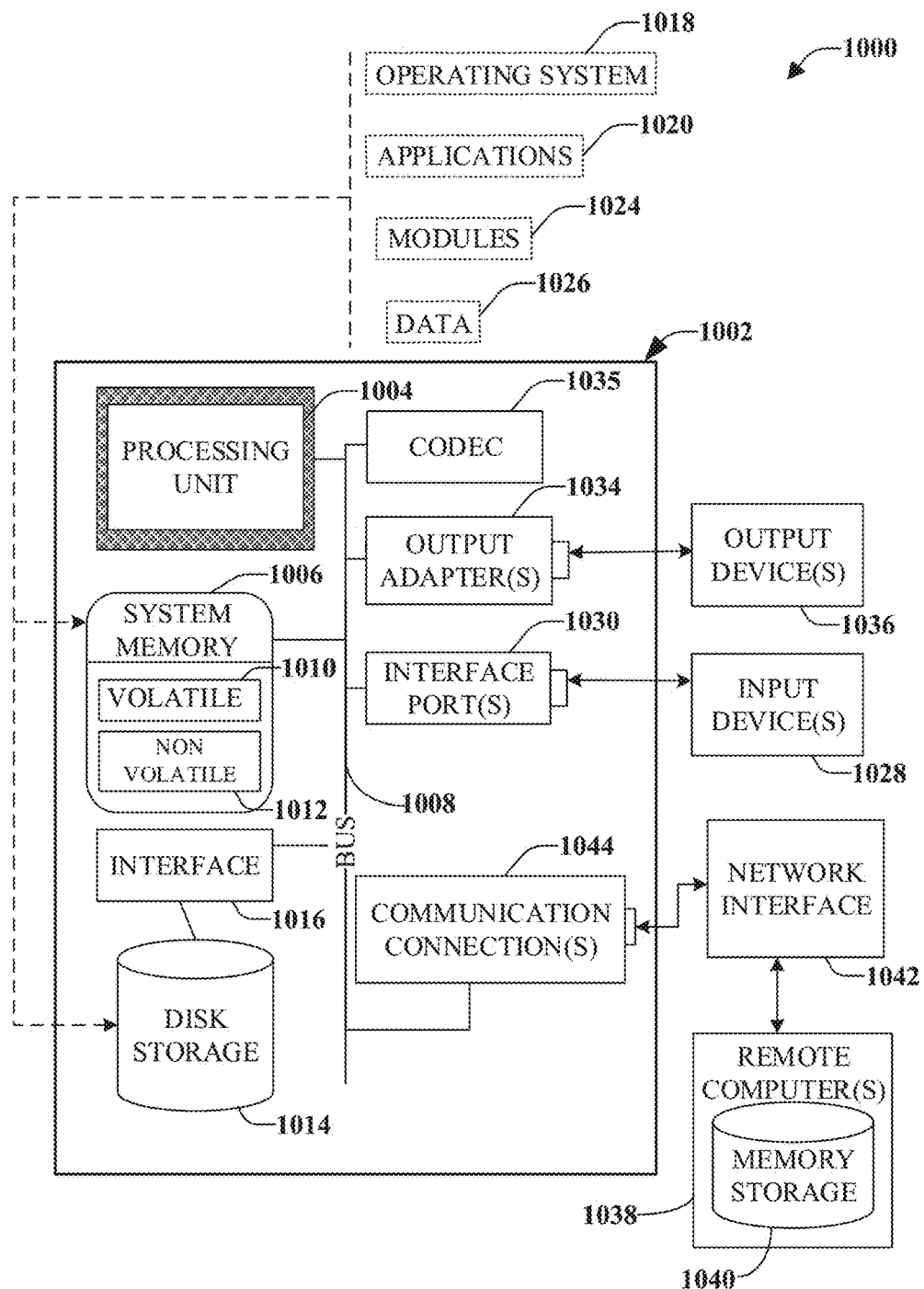
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with e or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a way of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other embodiments to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor that executes computer executable components stored in the memory, wherein the computer executable components comprise:
        a cleaning component that interfaces with an autonomous cleaning apparatus configured to clean an autonomous vehicle situated at a point of distribution (POD), wherein the cleaning component determines a cleaning procedure that is recommended to clean the autonomous vehicle;
        a service component that interfaces with an autonomous service apparatus configured to service the autonomous vehicle, wherein the service component determines a servicing procedure that is recommended to service the autonomous vehicle; and
        a charging component that interfaces with an autonomous charging apparatus configured to charge the autonomous vehicle utilizing an energy storage device that is recharged in response to a determination that a demand for energy is below a defined threshold, wherein the charging component determines a charging procedure that is recommended to charge the autonomous vehicle,
    wherein the cleaning component further determines a clean time indicative of an estimated time to clean the autonomous vehicle according to the cleaning procedure, wherein the charging component further determines a charge time indicative of an estimated time to charge the autonomous vehicle according to the charging procedure, and wherein the service component further determines a servicing time indicative of an estimated time to service the autonomous vehicle according to the servicing procedure.

2. The system of claim 1, wherein the cleaning component is configured to contemporaneously interface with a second autonomous cleaning apparatus configured to clean a second autonomous vehicle, situated at a second POD, contemporaneously with cleaning of the autonomous vehicle by the autonomous cleaning apparatus, wherein the charging component is configured to contemporaneously interface with a second autonomous charging apparatus configured to charge the second autonomous vehicle contemporaneously with charging of the autonomous vehicle by the autonomous charging apparatus, and wherein the service component is configured to contemporaneously interface with a second autonomous service apparatus configured to service the second autonomous vehicle contemporaneously with servicing of the autonomous vehicle by the autonomous service apparatus.

3. The system of claim 1, further comprising a timing component that compares the clean time, the charge time, and the service time and, in response, generates efficiency data comprising a recommended POD visit time.

4. The system of claim 3, wherein the recommended POD visit time is less than 15 minutes.

5. The system of claim 3, wherein the timing component determines the recommended POD visit time based on a hailing data indicative of a number of requests for transport by a group of autonomous vehicles having access to the POD.

6. The system of claim 3, wherein the timing component determines the recommended POD visit time based on diagnostic data received from the autonomous vehicle.

7. The system of claim 3, wherein the efficiency data further comprises an instruction to determine at least one of the cleaning procedure, the charging procedure, or the service procedure according to the recommended POD visit time.

8. The system of claim 1, further comprising a scanner component configured to generate, in response to an autonomous scan of the autonomous vehicle, vehicle state data indicative of a state of the autonomous vehicle, wherein at least one of:
the cleaning component selects the cleaning procedure based on the vehicle state data;
the charging component selects the charging procedure based on the vehicle state data; or
the service component selects the service procedure based on the vehicle state data.

9. The system of claim 8, further comprising a machine learning component that receives training data comprising at least the vehicle state data and, in response, recommends at least one of the cleaning procedure, the charging procedure, or the service procedure.

10. The system of claim 9, wherein the machine learning component further determines, based on a portion of the training data, an update to a function of at least one of the cleaning procedure, the charging procedure, or the service procedure, wherein the function is selected from a group comprising: an object recognition function, a collision avoidance function, a tool selection function, and an order function.

11. An apparatus, comprising:
a housing for a point of distribution (POD) station, comprising:
a rechargeable energy storage device that is charged in response to a determination that a demand for energy is below a defined threshold;
a vehicle port configured to receive an autonomous vehicle and to interface the autonomous vehicle to the POD station;
a scanner apparatus that, in response to the autonomous vehicle being received by the vehicle port, autonomously scans the autonomous vehicle, resulting in vehicle state data indicative of a state of the autonomous vehicle;
a cleaning apparatus configured to autonomously clean the autonomous vehicle according to a cleaning procedure that is determined based on the vehicle state data;
a charging apparatus configured to autonomously charge the autonomous vehicle according to a charging procedure that identifies a source for energy supplied to the autonomous vehicle; and
a service apparatus configured to autonomously service the autonomous vehicle according to a service procedure that is determined based on the vehicle state data,
wherein the housing is coupled to a second housing for a second POD station that comprises a second vehicle port configured to receive a second autonomous vehicle contemporaneously with the vehicle port receiving the autonomous vehicle.

12. The apparatus of claim 11, wherein the rechargeable energy storage device is configured to contemporaneously supply energy to the autonomous vehicle and the second autonomous vehicle.

13. The apparatus of claim 11, wherein at least one of the scanner apparatus, the cleaning apparatus, the charging apparatus, or the service apparatus is configured to operate on the autonomous vehicle and the second autonomous vehicle.

14. The apparatus of claim 11, further comprising a communication component configured to transmit the vehicle state data to a computing system and, in response, receive procedure data comprising the cleaning procedure, the charging procedure, and the service procedure.

15. A method, comprising:
instructing, by a system comprising a processor, an autonomous scanning device to scan an autonomous vehicle in response to the autonomous vehicle being received by a vehicle port of a point of distribution (POD) station, resulting in vehicle state data representing a state of the autonomous vehicle;
determining, by the system, a group of procedures to perform on the autonomous vehicle based on the vehicle state data, wherein the group of procedures comprises a cleaning procedure, a service procedure, and a charging procedure;
instructing, by the system, an autonomous cleaning apparatus to clean the autonomous vehicle according to the cleaning procedure;
instructing, by the system, an autonomous service apparatus to service the autonomous vehicle according to the service procedure;
instructing, by the system, an autonomous charging apparatus to charge the autonomous vehicle according to the charging procedure, wherein the charging procedure specifies, as an energy supply for charging the autonomous vehicle, a rechargeable battery system that is recharged in response to a determination that a demand for energy is below a defined threshold; and
determining, by the system, a total POD time based on the vehicle state data and determining at least one of the cleaning procedure, the service procedure, or the charging procedure based on the total POD time.

16. The method of claim 15, further comprising determining, by the system, the total POD time based on the vehicle state data and further based on diagnostic data received from the autonomous vehicle.

17. The method of claim 15, further comprising determining, by the system, the total POD time based on the vehicle state data and further based on hail data indicative of a number of requests for transport by a group of autonomous vehicles having access to the POD station.

* * * * *